(12) United States Patent
Stoodley et al.

(10) Patent No.: US 9,239,706 B2
(45) Date of Patent: Jan. 19, 2016

(54) SELECTIVE SPECULATIVE CLASS-BASED OPTIMIZATION

(71) Applicant: INTERNATIONAL BUSINESS MACHINES CORPORATION, Armonk, NY (US)

(72) Inventors: Mark G. Stoodley, Markham (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 13/869,189

(22) Filed: Apr. 24, 2013

(65) Prior Publication Data

US 2014/0325492 A1 Oct. 30, 2014

(51) Int. Cl.
G06F 9/45 (2006.01)
G06F 9/44 (2006.01)
G06F 17/00 (2006.01)
G06F 9/455 (2006.01)

(52) U.S. Cl.
CPC ............... *G06F 8/24* (2013.01); *G06F 9/4552* (2013.01); *G06F 9/45504* (2013.01); *G06F 9/45516* (2013.01)

(58) Field of Classification Search
CPC G06F 9/4552; G06F 9/45516; G06F 9/45504
See application file for complete search history.

(56) References Cited

U.S. PATENT DOCUMENTS

| | | | |
|---|---|---|---|
| 6,272,674 B1 * | 8/2001 | Holiday, Jr. | 717/174 |
| 6,557,023 B1 | 4/2003 | Taivalsaari | |
| 6,637,025 B1 * | 10/2003 | Beadle et al. | 717/148 |
| 6,658,657 B1 | 12/2003 | Lueh | |
| 6,684,393 B1 * | 1/2004 | Loen et al. | 717/151 |
| 6,779,188 B1 * | 8/2004 | Blandy et al. | 719/331 |
| 6,851,111 B2 * | 2/2005 | McGuire et al. | 717/166 |
| 6,883,165 B1 * | 4/2005 | Blandy et al. | 717/148 |
| 7,810,086 B2 | 10/2010 | Murphy et al. | |
| 8,620,640 B2 * | 12/2013 | Sandorfi et al. | 703/23 |
| 2002/0144243 A1 * | 10/2002 | Alexander, III et al. | 717/140 |
| 2005/0138611 A1 * | 6/2005 | Inglis et al. | 717/151 |

(Continued)

OTHER PUBLICATIONS

G. Klein, et al., "Verified Lightweight Bytecode Verification", Formal Techniques for Java Programs, Technical Report 269, Fernuniversitat Hagen, 2000, pp. 1-7.

O. Anderson et al., "Checked Load: Architectural Support for Javascript Type-Checking on Mobile Processors", 17th International Conference on High-Performance Computer Architecture (HPCA-17 2011), Feb. 12-16, 2011, San Antonio, Texas, USA. IEEE Computer Society 2011, pp. 419-430.

(Continued)

*Primary Examiner* — Isaac T Tecklu
*Assistant Examiner* — Mohammad Kabir
(74) *Attorney, Agent, or Firm* — Law Office of Jim Boice

(57) ABSTRACT

A method, apparatus, and/or computer program product performs selective speculative class-based optimization through the use of a type propagation analysis of class. Responsive to a determination that the type of class is not a fixed type, a determination is made as to whether the class is sub-classed. Responsive to a determination the class is not sub-classed, a virtual synthetic property method is created. The virtual synthetic property method is accommodated in an enhanced java virtual machine using a stack frame type. The stack frame type has associated metadata for throwing an exception and an invisibility property. The virtual synthetic property method, along with a virtual guard, is inlined, and a slow path is created. The slow path handles executions of the virtual synthetic property method when sub-classes of the class, which override an implementation of the virtual synthetic property method, are loaded in the future.

14 Claims, 8 Drawing Sheets

(56) References Cited

U.S. PATENT DOCUMENTS

| | | | |
|---|---|---|---|
| 2006/0190934 A1* | 8/2006 | Kielstra et al. | 717/148 |
| 2006/0190935 A1* | 8/2006 | Kielstra et al. | 717/148 |
| 2007/0245324 A1* | 10/2007 | Inglis et al. | 717/140 |
| 2009/0275414 A1* | 11/2009 | Lee et al. | 463/42 |
| 2010/0205673 A1 | 8/2010 | Burrell et al. | |
| 2011/0004866 A1 | 1/2011 | Frost | |
| 2011/0185344 A1 | 7/2011 | Darcy et al. | |
| 2011/0258616 A1 | 10/2011 | Sollich | |
| 2012/0084776 A1* | 4/2012 | Pirvu | 718/1 |
| 2012/0254867 A1 | 10/2012 | Lind et al. | |

OTHER PUBLICATIONS

Y. Oiwa, "Extending Java Virtual Machine to Improve Performance of Dynamically-Typed Languages", Senior Thesis, Dept. of Information Science, University of Tokyo, Feb. 16, 1999, pp. 1-26.

U.S. Appl. No. 14/200,239—Non-Final Office Action mailed Apr. 17, 2015.

* cited by examiner

CODE SNIPPET
400

A[i] = X;                                                                                        }—402

((C)X).doArrayStoreCheckOnC((C)A);
A[i] = X;                                                                                        }—404 class C {
        ...
        protected void doArrayStoreCheckOnC(C[]A) {                                              }—406
        }
} if (doArrayStoreCheckOnC has not been overridden by a subclass of C) {
        // do nothing
} else {
        ((C)X).doArrayStoreCheckOnC((C)A);                                                       }—408
}
A[i] = X;

<nopped guard>
fastPath:
A[i] = X;
...                                                                                              }—410
guardSlowPath:
        ((C)X).doArrayStoreCheckOnC((C)A);
        goto LfastPath;

<nopped guard>
fastPath:
A[i] = X;
...                                                                                              }—412
guardSlowPath:
        do array store check on A and X
        goto fastPath;

FIG. 4

CODE SNIPPET
500

```
class C {
        ...
        protected void doArrayStoreCheck(Object[] A) {
                if (A.class.componentClass !=C) // componentClass of "C[]" is "C"
                if (! This instanceofA.componentClass)
                        throw new ArrayStoreException();
        }
        ...
}
```
} 502

```
((C)X).doArrayStoreCheck(A);
A[i] = X;
```
} 504

```
If (C is not extended) {
        if (A.class.componentClass !=C)
                if (!C instanceof A.class.componentClass)
                        throw newArrayStoreException();
}
else
        X.doArrayStoreCheck(A); // full invocation on x
A[i] = X;
```
} 506

FIG. 5

SELECTIVE SPECULATIVE CLASS-BASED OPTIMIZATION

BACKGROUND

This disclosure relates generally to optimization of program compilation in a data processing system and more specifically to selective speculative class-based optimization in the data processing system.

Just In Time (JIT) compilers for (JAVA, a registered trademark of Oracle and/or its affiliates, and referred to herein as "Java") traditionally specialize compiled code very aggressively according to a current state of a class hierarchy. The aggressive specialization is needed because the Java specification requires support for dynamic class loading, but in practice Java applications are not particularly dynamic. Accordingly optimizing code for a current state of a class hierarchy is most frequently an effective way to optimize the way in which a Java application continues to execute. Probability of correct optimization is increased by using assumptions, which are registered against classes that have been optimized by the JIT compiler so that, when an assumption about the state of the class hierarchy is later invalidated, the code can be corrected.

An example of this kind of optimization is method inlining for virtual methods. For example, using a method invocation to C.foo( ) when there is currently only one class D in a hierarchy rooted at class C that implements the foo( ) method, then the JIT compiler will inline (i.e., add to a section of code) the D.foo( ) code without an explicit check to detect that the receiver object is D or one of the associated subclasses.

The JIT compiler also registers assumptions on all subclasses of C that correspond to a condition in which the code inlined for the invocation to C.foo( ) depends there be no other implementation of foo( ), so when this class is later extended by a class that overrides the foo( ) method, the JIT compiler can correct the inlined code. Any class that extends the hierarchy of C automatically inherits this assumption so that a respective compensation occurs when the assumption the JIT compiler made becomes invalid. In practice, the assumption framework tends to be an extremely effective tool. Other, similar, types of speculation can be performed, but the types use properties of classes that are extensible in the Java language, such as overriding a virtual method, implementing an interface method, or simply extending a class.

Conventional implementations therefore have typically focused on proving the explicit checks are not needed or moving checks to places that execute less frequently.

SUMMARY

According to one embodiment, a computer-implemented method for selective speculative class-based optimization is presented. The computer-implemented method comprises performing a type propagation analysis of class by a just in time compiler and determining by the just in time compiler whether the type of the class is a fixed type. Responsive to a determination the type of the class is not a fixed type, the computer-implemented method determines, by the just in time compiler, whether the class is sub-classed. Responsive to a determination the class is not sub-classed, the computer-implemented method creates a virtual synthetic property method associated with the class by the java runtime including the java virtual machine and the just in time compiler, wherein the virtual synthetic property method is accommodated in an enhanced JVM using a stack frame type generated by the just in time compiler, wherein the stack frame type has metadata associated for throwing an exception and an invisibility property, inlines the created method including a virtual guard and creates a slow path using the virtual synthetic property method, wherein the slow path handles executions of the virtual synthetic property method when sub-classes of the class are loaded in future that override an implementation of the virtual synthetic property method.

According to another embodiment, a computer program product for selective speculative class-based optimization comprises a computer recordable-type media containing computer executable program code stored thereon. The computer executable program code comprises computer executable program code for performing a type propagation analysis of class by a just in time compiler; computer executable program code for determining by the just in time compiler whether the type of the class is a fixed type; computer executable program code responsive to a determination the type of the class is not a fixed type, for determining by the just in time compiler whether the class is sub-classed; computer executable program code responsive to a determination the class is not sub-classed, for creating a virtual synthetic property method associated with the class by the java runtime including the java virtual machine and the just in time compiler, wherein the virtual synthetic property method is accommodated in an enhanced JVM using a stack frame type generated by the just in time compiler, wherein the stack frame type has metadata associated for throwing an exception and an invisibility property; computer executable program code for inlining the created method including a virtual guard and computer executable program code for creating a slow path using the virtual synthetic property method, wherein the slow path handles executions of the virtual synthetic property method when sub-classes of the class are loaded in future that override an implementation of the virtual synthetic property method.

According to another embodiment, an apparatus for selective speculative class-based optimization comprises a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to perform a type propagation analysis of class by a just in time compiler and determine by the just in time compiler whether the type of the class is a fixed type. Responsive to a determination the type of the class is not a fixed type, the processor unit executes the computer executable program code to direct the apparatus to determine by the just in time compiler whether the class is sub-classed. Responsive to a determination the class is not sub-classed, processor unit executes the computer executable program code to direct the apparatus to create a virtual synthetic property method associated with the class by the java runtime including the java virtual machine and the just in time compiler, wherein the virtual synthetic property method is accommodated in an enhanced JVM using a stack frame type generated by the just in time compiler, wherein the stack frame type has metadata associated for throwing an exception and an invisibility property, inline the created method including a virtual guard and create a slow path using the virtual synthetic property method, wherein the slow path handles executions of the virtual synthetic property method when sub-classes of the class are loaded in future that override an implementation of the virtual synthetic property method.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 4 is a block diagram of a class-specific code snippet example as used in the selective speculative class-based optimization system of FIG. 3 in accordance with one embodiment of the disclosure;

FIG. 5 is a block diagram of a less class-specific code snippet example as used in the selective speculative class-based optimization system of FIG. 3 in accordance with one embodiment of the disclosure;

DETAILED DESCRIPTION

Figure 1:
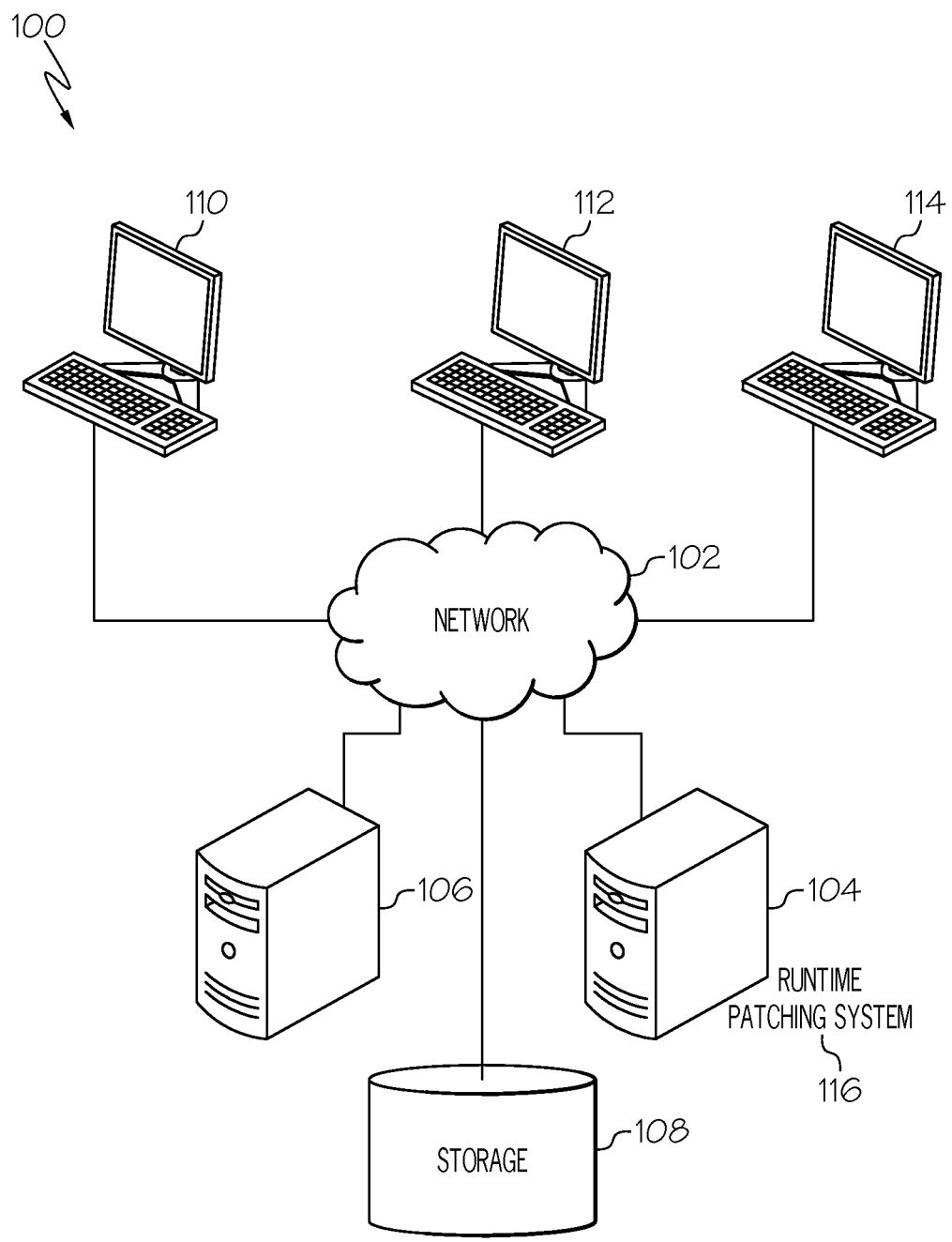
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
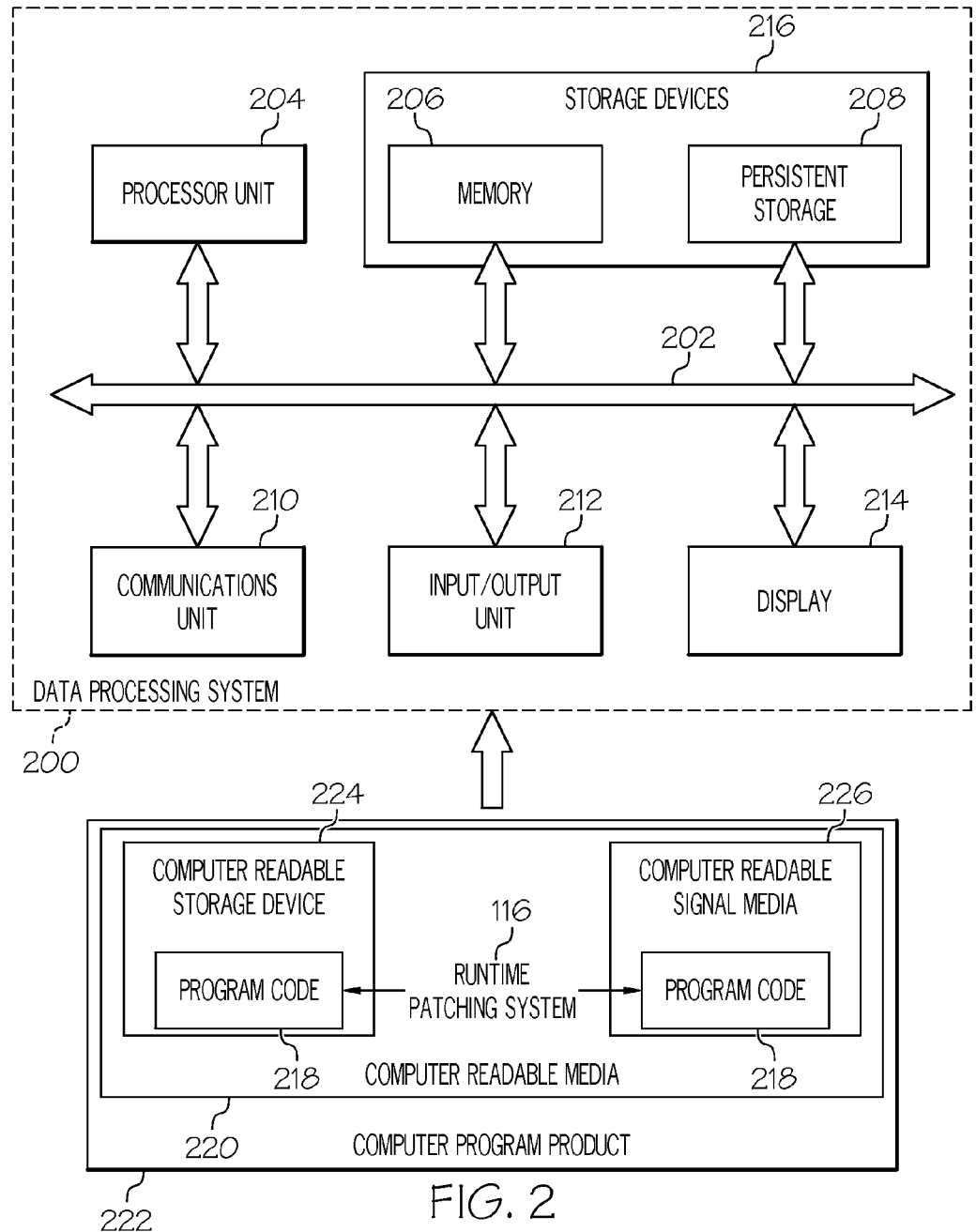
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented method for selective speculative class-based optimization is presented. Processor unit 204 performs a type propagation analysis of class by a just in time compiler and determines by the just in time compiler whether the type of the class is a fixed type. Responsive to a determination that the type of the class is not a fixed type, processor unit 204 determines, using the just in time compiler, whether the class is sub-classed. Responsive to a determination the class is not sub-classed, processor unit 204 creates a virtual synthetic property method associated with the class by the java runtime including the java virtual machine and the just in time compiler, wherein the virtual synthetic property method is accommodated in an enhanced JVM using a stack frame type generated by the just in time compiler, wherein the stack frame type has metadata associated for throwing an exception and an invisibility property. Processor unit 204 inlines the created method (including a virtual guard) and creates a slow path using the virtual synthetic property method, wherein the slow path handles executions of the virtual synthetic property method when sub-classes of the class, which override an implementation of the virtual synthetic property method, are loaded at a future time.

In conventional processing, a focus of previous implementations has been on proving explicit checks are not required or moving (or removing) the checks to locations in the code that tend to execute less frequently. Embodiments of the disclosure introduce a mechanism to speculatively (and under specific conditions selectively) optimize code in situations where the check is provably not needed currently but may be needed at a future time, which would therefore confound conventional conservative analyses.

In an example embodiment of the disclosure, a selective speculative class-based optimization of array store checks (or other similar functions) is used which provides an improved instruction path-length, along with an increase in memory usage for tracking information to be patched as well as for reliability and serviceability. Embodiments of the disclosure improve a code portion, which has been optimized using other techniques. In one embodiment, the embodiments may be used as a replacement of or complimentary to the other techniques as a further improvement. For example, embodiments provide improvement in the path-length of generated code by the compiler by avoiding a cost of performing unnecessary checks for a function or method.

Figure 3:
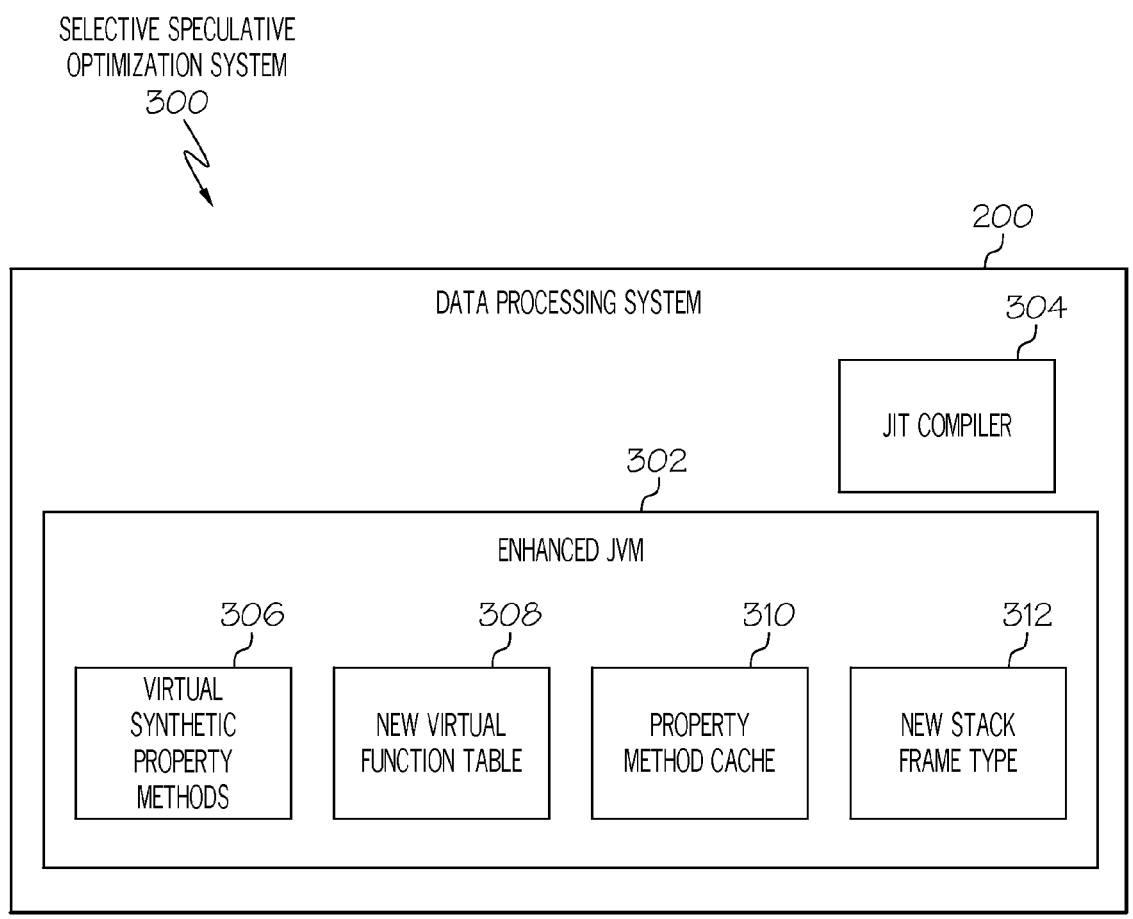
FIG. 3 is a block diagram representation of a selective speculative class-based optimization system operable for various embodiments of the disclosure.

With reference to FIG. 3, a block diagram of a selective speculative class-based optimization system operable for various embodiments of the disclosure is presented. Selective speculative class-based optimization system 300 is an example of an embodiment of the disclosure as implemented within data processing system 200 of FIG. 2. In a similar manner, an embodiment of selective speculative class-based optimization system 300 may be implemented within server 104 of network data processing system 100 of FIG. 1.

Selective speculative class-based optimization system 300 leverages support from the underlying data processing system. Selective speculative class-based optimization system 300 includes a number of functional components that may be implemented as seen in the figure or in other combinations so as to have more or less components than depicted without a departure from functional equivalence.

Enhanced JVM 302 provides a capability for speculative class-based optimization that extends a runtime assumption mechanism to enable just in time (JIT) compiler 304 to introduce new features (for example, methods or classes) into a class hierarchy that are not previously present in a Java application being executed. The new features are introduced to enable a category of speculative optimizations that may not otherwise be expressible as standard kinds of runtime assumptions.

Enhanced JVM 302 includes additional or changed components in the form of virtual synthetic property methods 306, new virtual function table 308, property method cache 310 and new stack frame type 312 in support of implementing selective speculative class-based optimization system 300. Virtual synthetic property methods 306 provide a set of property methods specifically in support of the implementation of selective speculative class-based optimization system 300. As used herein, a set comprises one or more elements, therefore in this regard one or more virtual synthetic property methods. Embodiments of the disclosure introduce a concept of a virtual synthetic property method that JIT compiler 304 utilizes to facilitate registering assumptions that enable speculative optimizations. The virtual aspect in this context denotes one particular implementation of the method will be executed (for example, using the class of each object that executes the code), as opposed to a specific implementation always being called (for example, a constructor method). Embodiments of the disclosed method validate whether a particular implementation of a virtual synthetic property method is appropriate in particular cases (for example, when class C has not been sub-classed, then the only possible implementation that could be called from this point is the particular implementation of this virtual synthetic property method for class C). When class C is later sub-classed, that sub-class may have a different implementation of the virtual synthetic property method and therefore a slow path with a virtual invocation is used because objects of C or a respective subclass may need to execute this code and an embodiment of the disclosed method has no knowledge ahead of time which class may come through.

In one embodiment, a virtual synthetic property method of virtual synthetic property methods 306 is introduced at a particular class in a hierarchy, though this property method may also be introduced at a root of the class hierarchy to augment all loaded classes. One aspect of this virtual synthetic property method is that, because of the artificial nature and absence of generated code that actually calls the virtual synthetic property method, there is no restriction that the virtual synthetic property method be added only when the class is loaded. Therefore the virtual synthetic property method of virtual synthetic property methods 306 can be added whenever JIT compiler 304 determines to make an assumption on the property for which the virtual synthetic property method is being created. A virtual synthetic property method may be variously referred to as an abstract property method, an artificial property method or a virtual property method without loss of meaning throughout the disclosure.

In one embodiment, once a virtual synthetic property method of virtual synthetic property methods 306 is added to a particular class, all of the subclasses of the particular class automatically inherit the current implementation of this method. A base implementation is favorable to an optimization process. In simple cases, the virtual synthetic property method may simply return a value. More complex cases may define other actions to occur when the virtual synthetic property method is executed. Therefore a most simple case is an empty method whereas a more complex case could involve a full implementation of a number of methods selectable at run time as additional optimization opportunities. A virtual synthetic property method is not required to contain a particular method or methods; rather the context is determined by the operation. Using the current example, the process "Array-Store" (e.g., see FIG. 4) has only one method; therefore there is no selectable run time option associated with the arraystore method.

New virtual function table 308 provides a capability to accept indices dynamically assigned by JIT compiler 304. Again, when the virtual synthetic property methods are only introduced into classes that have not yet been extended, assigning an index is straightforward by allocating a next available property method index in that class to the property method being created. All subsequently loaded classes that extend a particular class then inherit this respective virtual synthetic property method and consume the same index in the associated virtual synthetic property method virtual function table (VFT).

Property methods are not a part of the class file; therefore virtual synthetic property methods are not created when Java classes are loaded. Accordingly, a virtual function index may not always be possible to assign to the virtual synthetic property methods. In one case these virtual synthetic property methods are created at times when there exist no subclasses of the class C where the virtual synthetic property method is being introduced. So the particular virtual synthetic property method could simply consume a next virtual function table (VFT) index in the class C. However, adding a virtual function after a class has been loaded is not always a straightforward procedure (because data structures have typically been built with the virtual function table inlined into them, so extending this table is not always practical). New virtual function table 308 provides the needed flexibility.

Property method cache 310 provides a capability to store, from run to run, virtual synthetic property methods that are useful and information for which classes the virtual synthetic property methods are rooted in the hierarchy. Using an embodiment in which a persistent cache as in property method cache 310 exists, a class loading process can be augmented to search for virtual synthetic property methods associated with a class when the particular class is being loaded, and these virtual synthetic property methods may be added at that time into a virtual function table of the particular class as early as the time the particular class is loaded.

New stack frame type 312 provides a capability of being assigned special status/capabilities in the JVM (having associated meta data for throwing exceptions, for example) as well as being "special" in a sense that an associated virtual synthetic property method should not appear in exception back traces. For example, a complication arises when the virtual synthetic property methods are not always inlined into the compiled methods that use the respective virtual synthetic property methods. When a slow path virtual synthetic property method call is not inlined, that implies a stack frame will be built for the called virtual synthetic property method and that stack frame is both a "special" entity in enhanced JVM 302. For example, the virtual synthetic property method has meta data associated for throwing exceptions as well as being "special" to remain invisible in an exception back trace. Other specific stack frames in enhanced JVM 302 already have this invisibility property, for example, JIT to interpreter transfer frames, but in one embodiment these kinds of frames are not JIT compiler generated. In one embodiment, however, JIT compiler 304 in combination with enhanced JVM 302 provide a capability to create new stack frame type 312, corresponding to the virtual synthetic property methods, that have the desired behavior from enhanced JVM 302.

In the illustrative example, an embodiment of selective speculative class-based optimization system 300 using enhanced JVM 302 reduces overhead associated with arraystore checking. The JVM specification requires that at every store into a reference array element (for example, the aastore bytecode), operands are checked for type consistency. The JVM ensures that the types of the value being stored and the array are compatible, as described in a following description:

---
aastore aastore
Operation Store into reference array
Forms aastore = 83 (0x53)
Operand
Stack
..., arrayref, index, value ⇒
...
---

The arrayref is of type reference and also refers to an array whose components are of type reference. The index is of type int and value is of type reference. The arrayref, index, and value are popped from the operand stack. The reference value is stored as the component of the array at index.

At runtime, the type of value must be compatible with the type of the components of the array referenced by arrayref. Specifically, assignment of a value of reference type S (source) to an array component of reference type T (target) is allowed only if:

---
• If S is a class type, then:
 - If T is a class type, then S must be the same class as T, or S must be a subclass of T;
 - If T is an interface type, S must implement interface T.
• If S is an interface type, then:
 - If T is a class type, then T must be Object.
 - If T is an interface type, then T must be the same interface as S or a superinterface of S.
• If S is an array type, namely, the type SC[ ], that is, an array of components of type SC, then:
 - If T is a class type, then T must be Object.
 - If T is an array type TC[ ], that is, an array of components of type TC, then one of the following must be true:
  - TC and SC are the same primitive type.
  - TC and SC are reference types, and type SC is assignable to TC by these runtime rules.
 - If T is an interface type, T must be one of the interfaces implemented by arrays.
---

Array store checks are a basic type safety guarantee offered by the Java language and this check is required per the JVM specification anytime an aastore bytecode is to be executed, for example, when a reference is stored into an array element.

For example, given a Java statement of: a[i]=x; where the run time class type of a is A[ ] and the run time class type of x is X, the Java specification requires that an array store exception be raised when the object x is non null and class X is not the same as class A and class X is not a subclass of class A which is the basic logic of instructions generated by JIT compiler 304 for arraystore checks. Thus arraystore checks ensure the run time class types of elements of an array are compatible with the run time class type of the array. The code snippet in the following example illustrates how a program may throw an arraystore exception without compile time errors or warnings.

```
public static void foo( )
{
    String[ ] sa = new String[10];
    bar(sa);
}
public static void bar(Object[ ] oa)
```

-continued

```
{
oa[0] = new Integer(0); // should cause an array
store exception at run time
}
```

In one embodiment, however, only String objects would be stored into the oa array, and no arraystore exception would be thrown by the application even when a JIT compiler may not be able to definitively prove no exception would be thrown.

Existing solutions to reduce overhead associated with arraystore checking typically either focus on completely eliminating the arraystore check by proving at compile time that the arraystore check is unnecessary, or in deciding an optimal way in which to generate code to do necessary arraystore checking when the arraystore check cannot be eliminated. An embodiment of selective speculative class-based optimization system 300 can be used to avoid overhead of arraystore checking in predetermined situations.

In conventional use a JVM fails to employ a technique to perform a no operation (NOP) with regard to arraystore checks according to type propagation and run time assumptions as in an embodiment of selective speculative class-based optimization system 300. The purpose of the NOP (no operation) is not to change the state of the program environment. Use of the NOP acts as a placeholder, which is designed for replacement by an active instruction later in the compilation of the code.

An embodiment of selective speculative class-based optimization system 300 targets a property of a class that can be considered as if it were returned by a method defined by that class (which can then be overridden by subclasses). The property does not appear in the Java code itself, rather the property is something JIT compiler 304 uses to drive optimization of generated code using the run time assumptions framework of the JVM.

For example, an embodiment of selective speculative class-based optimization system 300 uses run time assumptions infrastructure and type propagation analysis of enhanced JVM 302 to reduce overhead associated with arraystore checking (effectively to perform a NOP of the checking operation) in predetermined, common scenarios including, when type information exists suggesting the arraystore involves an object on the right hand side of the store expression of type C and an array on the left hand side of the expression of type C[ ] and C has not been sub-classed yet. Optimizing arraystore checks in this scenario is an example of a more general optimization technique, which may be applied in other similar situations and is therefore not limited to the example of arraystore.

A previously implemented technique discloses to inline virtual methods without an explicit conditional guard as an example of how to efficiently inline a virtual method. An embodiment of selective speculative class-based optimization system 300 relies on efficiently inlining (virtual) synthetic methods, and in this case the synthetic methods created by JIT compiler 304 are for the purpose of speculatively (and optionally selectively) optimizing a program. In addition an embodiment of selective speculative class-based optimization system 300 implements a fundamental correctness requirement absent from previously used techniques for the alignment of values to be patched. Therefore previously used techniques lacking the alignment of values could be considered incomplete.

Actual implementations of these synthetic methods may be conceptual. JIT compiler 304 has a capability to implement any particular version of these virtual synthetic property methods, because JIT compiler 304 is aware of what kind of optimization is applicable. When compiling a portion of code involving the disclosed virtual synthetic property method, JIT compiler 304 places inline a base implementation along with a virtual guard. The virtual guard can be changed in future so as to cause a more conservative implementation to execute when the particular property becomes invalid. Further, the implemented virtual guard may also include a NOP instruction. A NOP is not required as there are other alternatives including use of conditional processing including "if" statements to resolve when to use the virtual call or actual call.

To save code space, however, JIT compiler 304 may choose not to inline a conservative implementation into the compiled code. Rather JIT compiler 304 performs a special virtual call. This virtual call would be special in a sense that the special virtual call is not like other Java virtual calls because Java users and applications will not be aware of existence of the special virtual call. When the method throws an exception, for example, this virtual synthetic property method will not appear in the stack back trace. When everything is done in a virtual machine to recognize the existence of this method (for example, the method has the appearance of a method in the class and all associated meta data exists so that garbage collection (GC) can operate correctly), then the method does not have to be inlined by JIT compiler 304 into the slow path. Exploitation of this characteristic occurs when there are several different possible slow path implementations, depending on what actually happened. The classes that are later loaded can determine which slow path implementation is required in accordance with the actual properties of those classes.

As previously stated, property methods are not a part of the class file and so they are not created when Java classes are loaded. As such, it may not always be possible to assign a virtual function index to them. In the extremely common case, however, these methods are created at times when there exist no subclasses of the class C where the property method is being introduced. So this property method could simply consume the next virtual function table (VFT) index in the class C. But adding a virtual function after a class has been loaded is not always a straightforward procedure (data structures have been built with the virtual function table inlined into them, so extending this table is not always practical). Instead, a new virtual function table could be introduced with indices that are dynamically assigned by the JIT compiler. Again, if the property functions are only introduced into classes that have not yet been extended, then assigning an index is straightforward (just allocate the next available property method index in that class to the property method being created). All subsequently loaded classes that extend this class then inherit this property method and consume the same index in their property method VFT.

This process can be improved upon if there is a mechanism (for example, property method cache 310) to remember, from run to run, property methods that are useful and which classes they are rooted at in the hierarchy. When such a persistent cache exists, then the class loading process can be augmented to look for property methods associated with a class when it is being loaded, and these property methods could be added at that time into the respective virtual function table for the class. Responsive to locating the respective virtual synthetic property method associated with the particular class, the respective virtual synthetic property method is added from the cache to a virtual function table associated with the particular class as early as the time the particular class is loaded, wherein the adding the respective virtual synthetic property method is done by the java virtual machine. The creation of the virtual synthetic property method using the cache at the time of loading the class is likely not performed by only the just in time compiler; the operation of adding a new virtual synthetic method at that stage is performed in general by the java virtual machine along with other routine tasks associated with loading a new class.

As discussed above, a complication arises when property methods are not always inlined into the compiled methods that use the respective property methods. When a slow path virtual synthetic property method call is not inlined, the implication is a stack frame will be built for the called property method and that particular stack frame is both a first class citizen within enhanced JVM 302, which means meta data is associated with the method for throwing exceptions, for example, as well as being special. Other stack frames in a JVM have an invisibility property including, for example, JIT to interpreter transfer frames. In one embodiment, these kinds of frames are not JIT generated. However there exists a capability to create the new type of stack frame, as in new stack frame type 312 corresponding to these virtual synthetic property methods that have the desired behavior from enhanced JVM 302.

With reference to FIG. 4 a class-specific code snippet example as used in the selective speculative class-based optimization system of FIG. 3 operable for various embodiments of the disclosure is presented. Code snippet 400 is an example of arraystore check optimization example using an embodiment of selective speculative class-based optimization system 300 of FIG. 3.

Using an example of arraystore check of code snippet 400, a new virtual synthetic property method called doArrayStoreCheckOnC (object) is introduced. The name used is only by example and not a significant label or a name of an actual element. Other names can be used which are indicative of a respective function being synthesized. In this example, the method is introduced by the JIT compiler, such as JIT compiler 304 of FIG. 3 for a class C in a class hierarchy. The class C is identified using a type propagation analysis during compile time analysis of program statement 402.

Type propagation is an analysis performed in the JIT compiler that propagates type information associated with expressions using the bytecodes related to allocation, type checking and other factors. Type information can be of two kinds of type. A first kind is fixed type, in which it is known that a given expression is exactly of a given class type C. A second kind is resolved type, in which it is known that a given expression is either exactly of a given class type C or a subclass of C. Usage of C in these examples simply denotes class and not a particular class or label.

The JIT compiler introduces the new virtual synthetic property method of doArrayStoreCheckOnC( ) when the compiler has information that the type of A and/or X is not one of a fixed type. For example, consider the case in which the type is not definitely known to be C, because only the type is C or one of its subclasses is known. In such a case the arraystore check cannot be eliminated unconditionally at compile time because C could be sub-classed by another class D in the future. Once that happens, an object of type C may be stored into an array of type D[ ] which should cause an exception. In this case the arraystore check should be performed to cause the exception to be thrown.

However, when the JIT compiler knows that the resolved type C has not been sub-classed at this particular point in time (where A is of resolved type C[ ] and X is of resolved type C) then the compiler can create the virtual synthetic property method doArrayStoreCheckOnC( ) on the class C with the implementation creating an empty method (reflecting that no arraystore check is currently required). Since doArrayStoreCheckOnC( ) has only a single implementation in the class hierarchy rooted at C at this point, the JIT compiler can inline the doArrayStoreCheckOnC( ) method along with a virtual guard containing a NOP instruction. The JIT compiler automatically creates an assumption on the class C to correct the NOP later when any class extends C and overrides the doArrayStoreCheckOnC( ) virtual synthetic property method. The JIT compiler can also selectively use knowledge of the doArrayStoreCheckOnC( ) implementations to place the actual arraystore check code on the slow path from the virtual guard (rather than the virtual call to doArrayStoreCheckOnC( )).

The JIT compiler takes the code being compiled through a set of steps. After introducing the doArrayStoreCheckOnC( ) virtual synthetic property method on the class C the code is originally expressed as in statements 404. Initially, the virtual synthetic property method conceptually has an implementation as shown in statements 406. That is, until the class C is extended, there is no arraystore check required. The JIT compiler places this implementation inline and initially transforms the call into statements 408.

The JIT compiler is aware that there are currently no subclasses of C, (in this example) and therefore creates a virtual guard with NOP to eliminate the condition in the if statements portion of statements 408 which transforms the code into statements 410.

The statement <nopped guard> of statements 410 is simply a placeholder. The JIT compiler inserts a NOP instruction large enough to hold a jump instruction to the statement of guardSlowPath. Should C ever be extended, the JIT runtime, in this example, will overwrite the NOP instruction with a jump instruction to the guardSlowPath.

Since the JIT compiler created the virtual synthetic property method doArrayStoreCheckOnC initially, the JIT compiler also is aware the slow path implementation of this method is to actually perform an arraystore check, so the JIT compiler can also inline the code for an actual arraystore check into the slow path as shown in statements 412, rather than the virtual call.

To save code space, the JIT compiler may choose not to inline the arraystore check and simply rely on a virtual call to perform the check. There is an additional complication however because the virtual synthetic property method should not appear in the call stack when the array store check fails and an exception is thrown.

When no class extends the class C, the code continues to execute the fast path, which essentially just stores X into A [i] with negligible overhead for the arraystore check. When C becomes extended, the code is patched to always execute the slow path code.

With reference to FIG. 5, a less class-specific code snippet example as used in the selective speculative class-based optimization system of FIG. 3 operable for various embodiments of the disclosure is presented. Code snippet 500 is a less class-specific example of arraystore check optimization example of FIG. 4 using an embodiment of selective speculative class-based optimization system 300 of FIG. 3.

An extension of the example of FIG. 4 enables the doArrayStoreCheckOnC virtual synthetic property method to be less class-specific (for example, by eliminating the OnC portion). Being less class-specific enables the JIT to rely on only one virtual synthetic property method for arraystore checks on all classes that have not yet been extended. Thus, rather than creating a separate doArrayStoreCheckOnC for each class C, the JIT compiler decides to optimize arraystore checks. Consider an initial implementation of C.doArrayStoreCheck( ) as in statements 502.

Note that this implementation using statements 502 is specialized for the class C (because C appears in the code for doArrayStoreCheck) but the signature of the method is generic so an implementation could be created for any possible class and easily overridden by respective subclasses without knowledge of where the method was introduced in a hierarchy. With a method like this, the JIT compiler can build code for any arraystore of the form A[i]=X where the declared (or derived using type propagation) class of A and X are both some class C that has not yet been extended. When another arraystore is compiled somewhere else in a compilation of code where the derived class of A and X is found to be another non-extended class D, then the same doArrayStoreCheck( ) method can be used (for example, duplicate versions of doArrayStoreCheckOnC and doArrayStoreCheckOnD are not needed). Starting with an implementation on Object, for example, every single class could have a doArrayStoreCheck( ) method and the JIT compiler could exploit all. Every arraystore check could be generated as a call to the doArrayStoreCheck implementation for the derived class of A (call it C) as in statements 504.

The JIT compiler would, through a normal course of operation, decide whether a particular implementation should be inlined. When the class C is currently not extended, the JIT compiler would decide to inline the class C implementation of the doArrayStoreCheck(Object[ ] A) as shown in statements 506.

Now, when the type propagation optimization of the JIT compiler encounters something in this method that refines the type of x to C or a subclass, then the virtual guard further refines that information within the inlined code region to say that x is a C. That means that the JIT compiler can optimize away the entire inlined implementation of doArrayStoreCheck because the first condition is proven false. The virtual guard with NOP will proceed as shown earlier.

Again, because the JIT compiler is aware of the doArrayStoreCheck implementation, the JIT compiler can choose to inline the virtual call on the slow path as well to avoid the need to hide the presence of doArrayStoreCheck( )method to the application itself.

In other examples this technique defines a category of speculative optimizations that can be added to an existing JIT compiler. Some other examples include, but are not limited to, eliminating check casts for scalar stores arising from parameter down casting, eliminating spine checks for component classes for which a non-contiguous array has not yet been allocated (to be invalidated by new array allocations rather than by class loads, but same principle), eliminating bounds checks for classes that have no arrays allocated of size <=N (where N=0 is an interesting special case), eliminating write barriers for classes for which no instances have been tenured, identifying and specializing singleton objects of particular classes.

The basic technique of selective speculative class-based optimization of the disclosure can be applied to optimize many different kinds of properties that can be expressed as assumptions on the current state of a class hierarchy or a current state of the JVM. Representing these optimizations as virtual synthetic property methods in the class hierarchy simplifies implementation in an existing JIT compiler that performs virtual guard operations.

Figure 6:
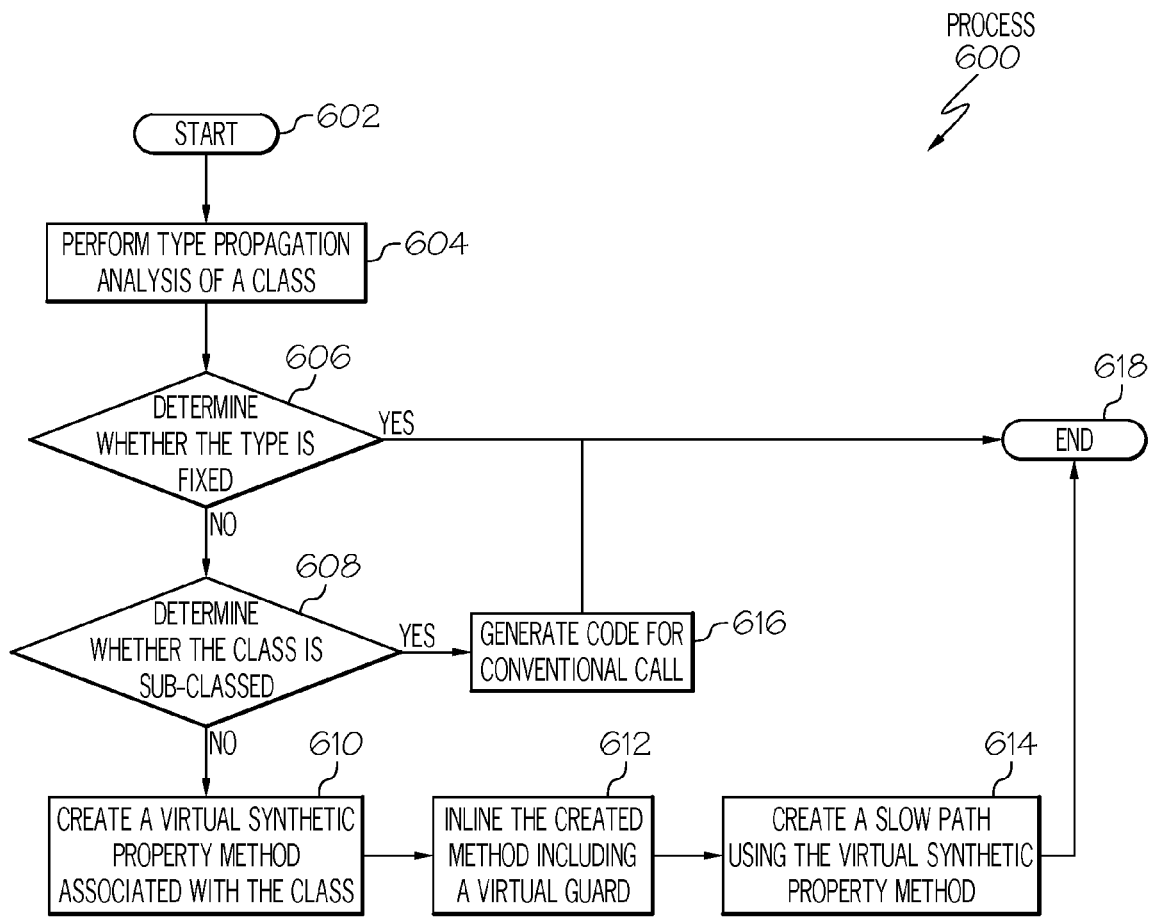
FIG. 6 a flowchart of a process for creating a virtual synthetic property method as used in the selective speculative class-based optimization system of FIG. 3 operable for various embodiments of the disclosure.

With reference to FIG. 6, a flowchart of a process for creating a synthetic method as used in the selective speculative class-based optimization system of FIG. 3 operable for various embodiments of the disclosure is presented. Process 600 is an example of a compile time enabling optimization using an embodiment of selective speculative class-based optimization system 300 of FIG. 3. Process 600 enables the selective speculative class-based optimization to occur.

Process 600 begins (step 602) and performs a type propagation analysis of a class (step 604). The class being analyzed is contained within a code portion being compiled, for example a collection of Java statements being compiled by a Just In Time compiler.

Process 600 determines whether the type, associated with the class being compiled, is a fixed type (step 606). In response to a determination that the type, associated with the class, is a fixed type, process 600 terminates (step 618). No further processing is required because the type of the class is fixed. In response to a determination that the type, associated with the class, is not fixed, (therefore a resolved type) process 600 determines whether the class is sub-classed (step 608). In response to a determination that the class is sub-classed, process 600 generates code for a conventional function call (step 616) and terminates as before (step 618).

In response to a determination that the class is not sub-classed, process 600 creates a virtual synthetic property method associated with the class (step 610). The virtual synthetic property method may be created, by the java runtime that includes the java virtual machine and the just in time compiler, with an empty method on the class, other form of method or one or more methods in accordance with the particular function being used. The creation of the virtual synthetic property method need not be done only by the just in time compiler, but can be done by the java virtual machine as well. The virtual synthetic property method is accommodated in an enhanced JVM using a stack frame type generated by the just in time compiler, wherein the stack frame type has metadata associated for throwing an exception and an invisibility property.

Process 600 performs an inline operation to place the created virtual synthetic property method including a virtual guard (step 612). The virtual guard, which may include a NOP instruction, is a placeholder sized to accommodate a jump instruction to the slow path.

Process 600 creates a slow path using the virtual synthetic property method, wherein the slow path handles executions of the virtual synthetic property method when sub-classes of the class are loaded in future that override an implementation of the virtual synthetic property method (step 614) and terminates thereafter as before (step 618).

Figure 7:
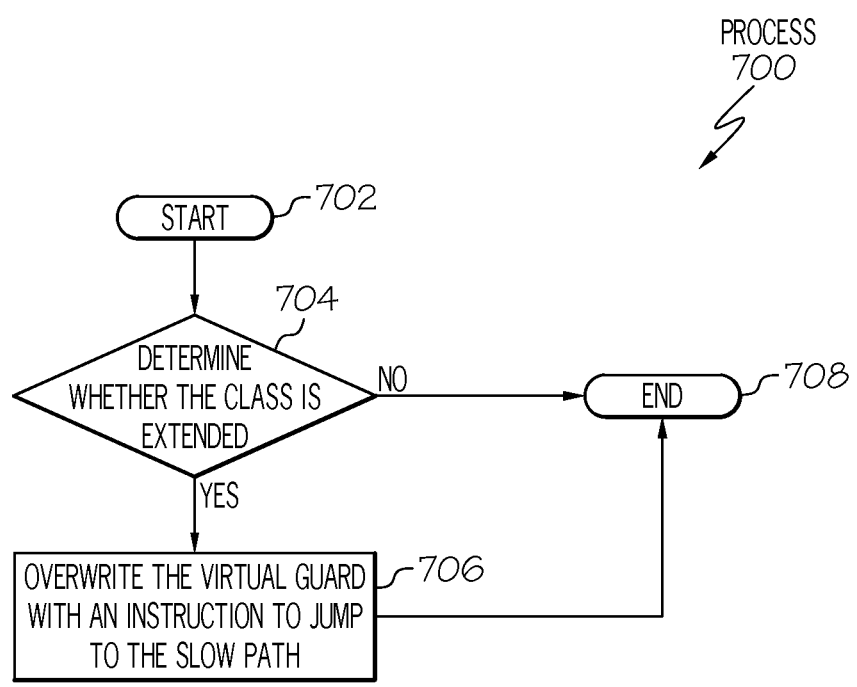
FIG. 7 is a flowchart of a process of a run time optimization as used in the selective speculative class-based optimization system of FIG. 3 operable for various embodiments of the disclosure.

With reference to FIG. 7, a flowchart of a process of a run time optimization as used in the selective speculative class-based optimization system of FIG. 3 operable for various embodiments of the disclosure is presented. Process 700 is an example of a run time optimization using an embodiment of selective speculative class-based optimization system 300 of FIG. 3.

Process 700 starts (step 702) and determines whether the class is extended (step 704). The class being examined is a class, which was previously compiled using process 600 of FIG. 6. In response to a determination that the class is extended, process 700 overwrites the virtual guard, previously created in process 600 of FIG. 6 with an instruction to jump to the slow path (step 706) and terminates thereafter (step 708). The actual instruction is an instruction of the intended function. For example, in the examples used throughout the disclosure of an arraystore check, the actual arraystore check instruction is placed, otherwise another instruction representative of a particular target function is used.

Figure 8:
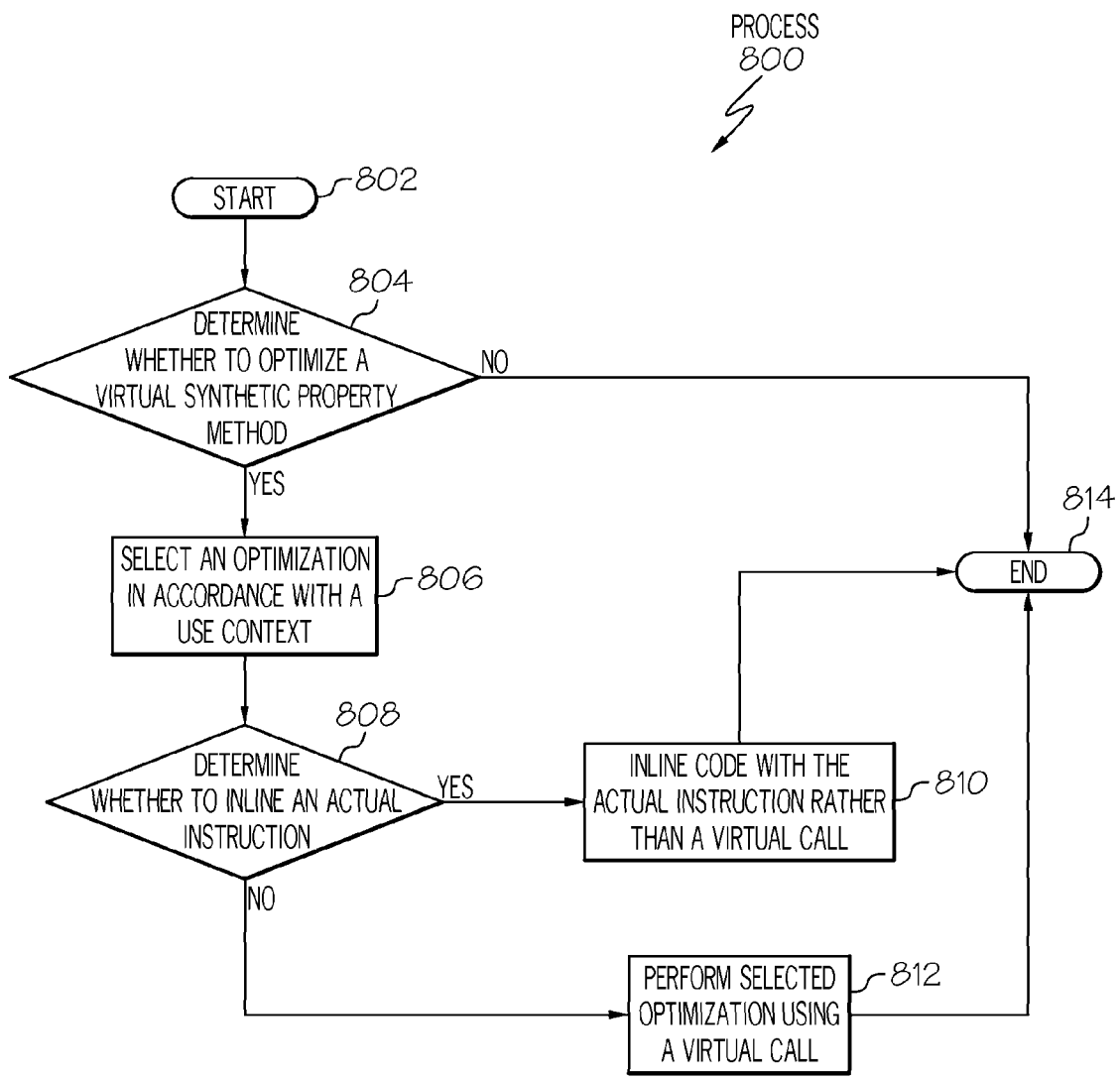
FIG. 8 is a flowchart of a process of selective optimization as used in the selective speculative class-based optimization system of FIG. 3 operable for various embodiments of the disclosure.

With reference to FIG. 8, a flowchart of a process of selective optimization as used in the selective speculative class-based optimization system of FIG. 3 operable for various embodiments of the disclosure is presented. Process 800 is an example of selective run time optimization using an embodiment of selective speculative class-based optimization system 300 of FIG. 3.

Process 800 begins (step 802) and determines whether to optimize a virtual synthetic property method (step 804). The virtual synthetic property method was created previously using process 600 of FIG. 6. Responsive to a determination to not optimize a virtual synthetic property method, process 800 terminates (step 814). For example, a use context in this case may be a particular situation in which the virtual synthetic property method includes only one method.

Responsive to a determination to optimize a virtual synthetic property method, process 800 selects an optimization in accordance with a use context (step 806). For example, a use context may be a particular situation in which the virtual synthetic property method includes particular methods for specific subclasses of the instant class. In this case a particular optimization would be selected in accordance with the particular subclass. In another example, a use context could dictate removal of unnecessary code of a method to further streamline processing to use only a minimal code portion of the virtual synthetic property method.

Process 800 determines whether to inline an actual instruction (step 808). Responsive to a determination to inline an actual instruction, process 800 injects code inline with the actual instruction rather than a virtual call (step 810) and terminates thereafter (step 814). The code, which is placed inline, is the code for the target function, which was previously defined as a virtual synthetic property method.

Responsive to a determination to not inline an actual instruction, process 800 performs the selected optimization using a virtual function (step 812) and terminates thereafter (step 814). Process 800 performs the selected optimization using the target function, previously defined as one of a virtual synthetic property method.

Thus is presented in an illustrative embodiment a computer-implemented method for selective speculative class-based optimization. The method comprises performing a type propagation analysis of class by a just in time compiler and determining by the just in time compiler whether the type of the class is a fixed type. Responsive to a determination the type of the class is not a fixed type, the computer-implemented method determines, by the just in time compiler, whether the class is sub-classed. Responsive to a determination the class is not sub-classed, the computer-implemented method creates a virtual synthetic property method associated with the class by the java runtime including the java virtual machine and the just in time compiler, wherein the virtual synthetic property method is accommodated in an enhanced JVM using a stack frame type generated by the just in time compiler, wherein the stack frame type has metadata associated for throwing an exception and an invisibility property, inlines the created method including a virtual guard and creates a slow path using the virtual synthetic property method, wherein the slow path handles executions of the virtual synthetic property method when sub-classes of the class are loaded in future that override an implementation of the virtual synthetic property method.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

Note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product for selective speculative class-based optimization, the computer program product comprising:
a non-transitory computer readable storage medium having encoded thereon:
computer executable program code for performing a type propagation analysis of a class by a just in time compiler;
computer executable program code for determining by the just in time compiler whether a type of the class is a fixed type;
computer executable program code for in response to a determination that the type of the class is not a fixed type, determining by the just in time compiler whether the class has a sub-class;
creating a virtual synthetic property method associated with the class by a runtime including a virtual machine and the just in time compiler, wherein the virtual synthetic property method provides a set of property methods specifically in support of an implementation of a selective speculative class-based optimization system that leverages support from an underlying data processing system, wherein the virtual synthetic property method is accommodated in an enhanced virtual machine using a stack frame type generated by the just in time compiler, wherein the just in time compiler in combination with the enhanced virtual machine creates the stack frame type, wherein the stack frame type has metadata associated for throwing an exception and possessing an invisibility property, and wherein the virtual synthetic property method is invisible in an exception back trace;
computer executable program code for inlining the virtual synthetic property method including a virtual guard; and
computer executable program code for creating a slow path using the virtual synthetic property method, wherein the slow path handles executions of the virtual synthetic property method in response to sub-classes of the class being loaded at a future time, wherein the sub-classes of the class override an implementation of the virtual synthetic property method.

2. The computer program product of claim 1, further comprising:
computer executable program code for creating a cache for storing a usage of the virtual synthetic property method, wherein the cache contains a set of virtual synthetic property methods; and
computer executable program code for maintaining a history of previous usage of the virtual synthetic property method from one run to a next run.

3. The computer program product of claim 2, further comprising:
computer executable program code for searching the cache for a respective virtual synthetic property method associated with a particular class upon a class load operation;
computer executable program code for in response to locating the respective virtual synthetic property method associated with the particular class, adding the respective virtual synthetic property method from the cache to a virtual function table associated with the particular class as early as a time the particular class is loaded, wherein said adding the respective virtual synthetic property method is done by the virtual machine.

4. The computer program product of claim 1, further comprising:
computer executable program code for determining whether to inline an actual instruction; and
computer executable program code for in response to a determination to inline the actual instruction, inlining code with the actual instruction rather than the virtual synthetic property method, wherein the virtual guard includes a No-OPeration (NOP) instruction and is sized to accommodate a jump instruction to the slow path.

5. The computer program product of claim 1, further comprising:
computer executable program code for determining whether to optimize the virtual synthetic property method;
computer executable program code for in response to a determination to optimize the virtual synthetic property method, selecting an optimization in accordance with a use context.

6. The computer program product of claim 1, wherein a virtual function table associated with a particular class is dynamically assigned indices by the just in time compiler for each virtual synthetic property method created in association with the particular class.

7. The computer program product of claim 1, further comprising:
computer executable program code for determining whether to inline an actual instruction; and
computer executable program code for in response to a determination to inline the actual instruction, inlining the code with the actual instruction rather than a virtual function call.

8. An apparatus for selective speculative class-based optimization, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
perform a type propagation analysis of a class by a just in time compiler;
determine by the just in time compiler whether a type of the class is a fixed type;
responsive to a determination that the type of the class is not a fixed type, determine by the just in time compiler whether the class has a sub-class;
create a virtual synthetic property method associated with the class by a runtime including a virtual machine and the just in time compiler, wherein the virtual synthetic property method is accommodated in an enhanced virtual machine using a stack frame type generated by the just in time compiler, wherein the stack frame type has metadata associated for throwing an exception and an invisibility property;
inline the virtual synthetic property method including a virtual guard; and
create a slow path using the virtual synthetic property method, wherein the slow path handles executions of the virtual synthetic property method when sub-classes of the class being loaded at a future time, and wherein the sub-classes of the class override an implementation of the virtual synthetic property method.

9. The apparatus of claim 8, wherein the processor unit executes the computer executable program code to further direct the apparatus to:
 create a cache for storing a usage of the virtual synthetic property method, wherein the cache contains a set of virtual synthetic property methods; and
 maintain a history of previous usage of the virtual synthetic property method from one run to a next run.

10. The apparatus of claim 9, wherein the processor unit executes the computer executable program code to further direct the apparatus to:
 search the cache for a respective virtual synthetic property method associated with a particular class upon a class load operation;
 responsive to locating the respective virtual synthetic property method associated with the particular class, add the respective virtual synthetic property method from the cache to a virtual function table associated with the particular class as early as a time the particular class is loaded, wherein the adding the respective virtual synthetic property method is done by the virtual machine.

11. The apparatus of claim 8, wherein the processor unit executes the computer executable program code to further direct the apparatus to:
 inline code with an actual instruction rather than the virtual synthetic property method, wherein the virtual guard includes a No-OPeration (NOP) instruction and is sized to accommodate a jump instruction to the slow path.

12. The apparatus of claim 8, wherein the processor unit executes the computer executable program code to further direct the apparatus to:
 determine whether to optimize the virtual synthetic property method; and
 responsive to a determination to optimize the virtual synthetic property method, select an optimization in accordance with a use context.

13. The apparatus of claim 8, wherein the processor unit executes the computer executable program code to further direct the apparatus to:
 determine whether to inline an actual instruction; and
 responsive to a determination to inline the actual instruction, inline the code with the actual instruction rather than a virtual function call.

14. The computer program product of claim 4, further comprising:
 computer executable program code for determining whether the class is extended to create a sub-class; and
 computer executable program code for in response to determining that the class is extended, overwriting the NOP instruction and jumping to the slow path.

* * * * *